Oct. 25, 1949.  R. O. BOYKIN, JR  2,485,858
MILLING MACHINE
Filed May 27, 1946

Inventor
ROBERT O. BOYKIN, JR.

By
*M. C. Hayes*
Attorney

Patented Oct. 25, 1949

2,485,858

UNITED STATES PATENT OFFICE 2,485,858

MILLING MACHINE

Robert O. Boykin, Jr., Los Angeles, Calif., assignor to the United States of America as represented by the Secretary of the Navy Application May 27, 1946, Serial No. 672,487

4 Claims. (Cl. 90—20)

This invention relates to milling machines and more particularly to milling machines which are adapted to mill the ends of a rodlike member so that a series of such members may be milled to a constant length.

An object of the invention is to provide a milling machine of this character which is particularly designed for remote control operation, thereby adapting it to perform milling operations on explosive material, such as ballistite.

Another object of the invention is to provide a milling machine of this character which is relatively inexpensive to manufacture and may be easily adjusted to trim or mill rods or grains of explosives to definite specified lengths.

With the above and other objects in view as may appear hereinafter, reference is made to the accompanying specifications and drawing in which.

Figure 1:
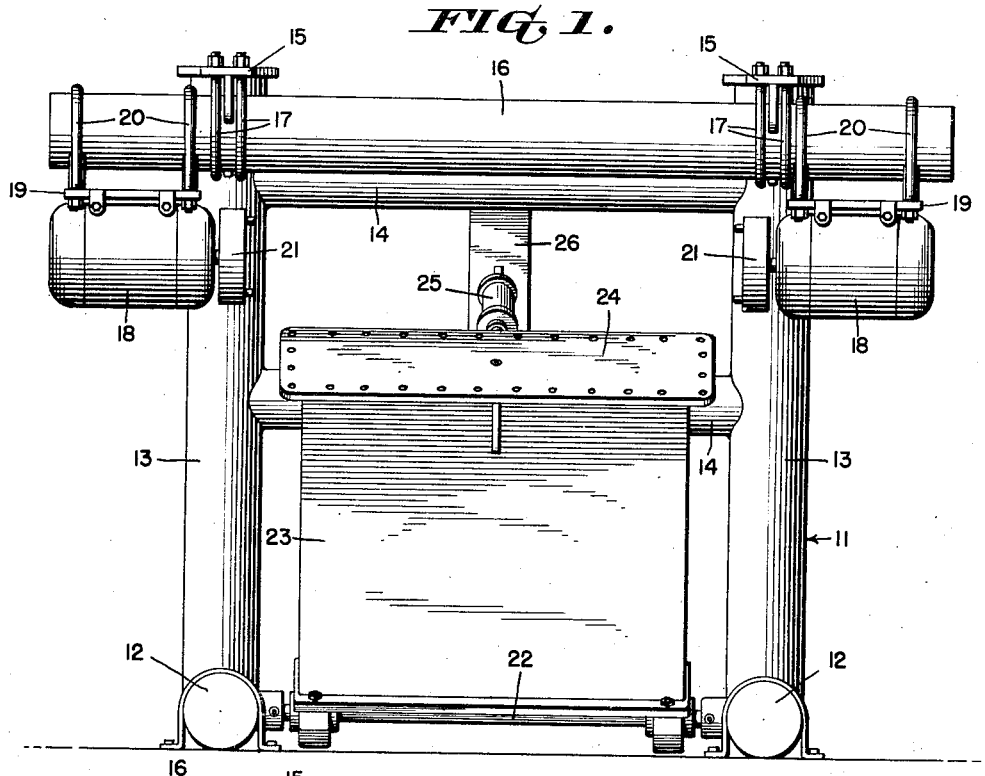
Fig. 1 is a front elevational view of a milling machine made in accordance with the present invention.
Figure 2:
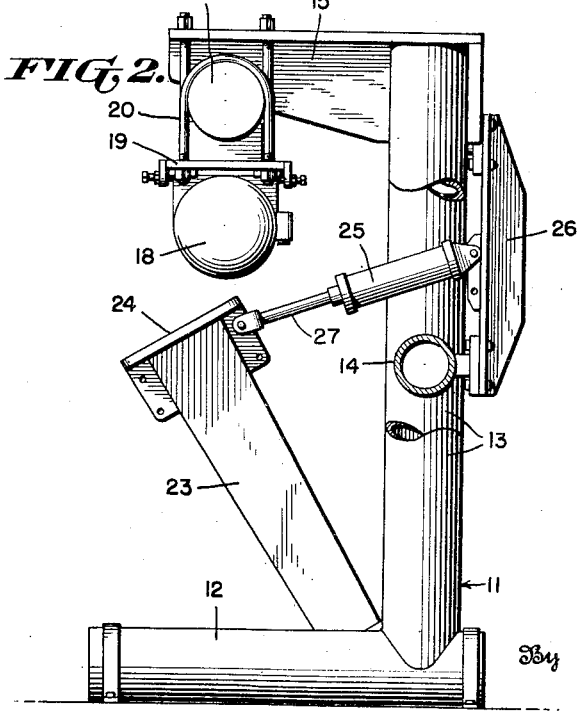
Fig. 2 is a side elevational view of the milling machine depicted in Fig. 1.

The milling machine comprises a frame structure shown generally at 11 preferably formed of welded tubular members. The frame structure includes a pair of base members 12 to the rear ends of which are welded uprights 13 which are connected by cross members 14. The upper ends of uprights 13 are provided with forwardly directed brackets 15 which may be formed from welded sheet stock. The brackets have depending webs as shown which are notched to receive a tubular beam 16, the beam being held in the notches of the brackets 15 by U-bolts 17.

A pair of motors 18 are carried by the beam 16 at the ends thereof, and depend from mounting plates 19 which, in turn, are suspended by U-bolts 20 from the beam 16. The motors 18 are disposed in co-axial relation and drive milling heads 21.

Connecting the base members 12 below the uprights 13 is a shaft 22 which is adapted to journal a table frame 23 provided with a table face plate 24 at its upper side. The table face plate is adapted to be oscillated in a path traversing but below the axis of the motors and their milling heads, and thus, to carry any well-known supporting fixture (not shown) designed to hold the material to be milled. The present invention is directed particularly to ballistite or other explosive extruded grains or rods intended to be employed as rocket propellants. Oscillation of the table frame 23 is effected hydraulically by means of a cylinder 25 attached by one end to a connecting bar 26 disposed between the cross members 14, and a rod 27 of the piston (not shown) within the cylinder joined to the table frame near the top plate 24.

In operation, the grain or rod of ballistite is secured to the supporting jig or fixture. The operator may then control the succeeding operational steps from a safe position, as from behind a barricade, by actuating the cylinder 25 and the motors 18 to cause the ends of the grain to be moved past the milling heads 21. Upon completion of the above operation the motors may be turned off and the operator may return to the machine to insert another grain.

I claim:

1. A machine for milling the ends of explosive powder grains comprising, a frame structure including base members, uprights extending therefrom, said uprights carrying overhanging brackets at the upper ends thereof, and a beam suspended from said brackets, a motor carried by said beam and a milling head carried by said motor, a table structure adapted to support the material to be milled, means for oscillatably supporting said table structure for movement of said material in a path to intersect the projection of the axis of said milling head, and means for oscillating said table.

2. A machine for milling the ends of explosive powder grains comprising, a frame structure including base members, uprights extending therefrom, an overhanging bracket carried at the upper end of each of said uprights, a beam suspended from said brackets, co-axially disposed motors carried by said beam, a milling head carried by each of said motors, a table structure adapted to support the material to be milled and oscillatably connected with said frame structure on an axis located adjacent the lower ends of said uprights whereby said material may be moved in an oscillatory path between said milling heads, and means for controllably oscillating said table structure.

3. A milling machine in accordance with claim 1 in which the means for oscillating said table comprises a hydraulic cylinder pivotally mounted on a fixed portion of said frame structure and a piston for said cylinder, an extension of said piston being pivotally mounted on said table structure, said piston being movable in response to hydraulic pressures within said cylinder whereby said table is moved between said milling heads.

4. A remotely controllable machine for milling the ends of explosive powder grains comprising, frame structure having a base, upright members extending from said base, said uprights carrying overhanging brackets at the upper ends thereof, a beam securely fastened to each of said brackets and serving to positively space the brackets apart, coaxially disposed motors rigidly supported in spaced relationship upon said beam, a milling head carried by each of said motors, and a work supporting table structure oscillatably connected to the base portion of said frame said table structure being remotely operable whereby said explosive powder grains may be carried in a path between the milling heads so as to be accurately milled to a measured length.

ROBERT O. BOYKIN, JR.

REFERENCES CITED

The following references are of record in the file of this patent:

UNITED STATES PATENTS

| Number | Name | Date |
|---|---|---|
| 231,427 | Johnson | Aug. 24, 1880 |
| 387,007 | Partridge | July 31, 1888 |
| 1,223,324 | Hansen | Apr. 17, 1917 |
| 1,700,309 | Cole | Jan. 29, 1929 |
| 2,141,191 | Lundberg et al. | Dec. 27, 1938 |
| 2,258,602 | Follansbee | Oct. 14, 1941 |